US009385608B1

(12) United States Patent
Chakraborty

(10) Patent No.: US 9,385,608 B1
(45) Date of Patent: Jul. 5, 2016

(54) DC-TO-DC CONVERTERS CAPABLE OF COMMUNICATING INFORMATION BETWEEN A SLAVE CIRCUIT AND A MASTER CONTROLLER, AND ASSOCIATED DEVICES AND METHODS

(71) Applicant: Volterra Semiconductor Corporation, San Jose, CA (US)

(72) Inventor: Sombuddha Chakraborty, Redwood City, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 262 days.

(21) Appl. No.: 14/138,023

(22) Filed: Dec. 21, 2013

(51) Int. Cl.
| *H02M 3/157* | (2006.01) |
| *H02M 3/158* | (2006.01) |
| *H02M 3/156* | (2006.01) |
| *H02M 1/00* | (2006.01) |
| *H02M 1/32* | (2007.01) |

(52) U.S. Cl.
CPC ............ *H02M 3/1584* (2013.01); *H02M 3/157* (2013.01); *H02M 1/32* (2013.01); *H02M 3/156* (2013.01); *H02M 2001/0012* (2013.01)

(58) Field of Classification Search
CPC ............. H02M 2001/0012; H02M 2001/0067; H02M 1/32; H02M 3/157; H02M 3/158; H02M 3/1584; H02M 2003/1586
USPC ......................................................... 363/72
See application file for complete search history.

(56) References Cited

U.S. PATENT DOCUMENTS

| 6,157,093 | A * | 12/2000 | Giannopoulos ..... | H02M 1/4225 307/11 |
| 6,198,261 | B1 * | 3/2001 | Schultz ................. | H02M 3/157 323/272 |
| 7,239,257 | B1 * | 7/2007 | Alexander ............ | H02M 3/157 341/138 |
| 7,239,530 | B1 | 7/2007 | Djekic et al. | |
| 8,710,810 | B1 | 4/2014 | McJimsey et al. | |
| 2004/0075600 | A1 * | 4/2004 | Vera ....................... | H02J 1/102 341/166 |
| 2006/0212138 | A1 * | 9/2006 | Zhang ................. | G05B 19/0423 700/22 |
| 2010/0238060 | A1 * | 9/2010 | Nien .................. | H02M 3/1584 341/155 |
| 2011/0051479 | A1 * | 3/2011 | Breen ................ | H02M 3/1584 363/148 |
| 2012/0086416 | A1 * | 4/2012 | Kudo .................. | H02M 3/1584 323/265 |
| 2014/0077781 | A1 * | 3/2014 | Murakami ............. | H02M 3/04 323/282 |
| 2015/0115910 | A1 * | 4/2015 | Jiang ................... | H02M 3/1584 323/271 |

* cited by examiner

*Primary Examiner* — Fred E Finch, III
(74) *Attorney, Agent, or Firm* — Lathrop & Gage LLP

(57) ABSTRACT

A slave circuit for a DC-to-DC converter includes a switching circuit adapted to repeatedly switch a switching node between two different voltage levels, a slave control adapted to control switching of the switching circuit based at least in part on control signals from a master controller, a communication port, and a communication module. The communication module is adapted to (a) generate an analog slave communication signal at the communication port, where the analog slave communication signal represents information associated with the slave circuit, and (b) generate a digital slave communication signal at the communication port in response to occurrence of an event, where the digital slave communication signal represents additional information associated with the slave circuit.

32 Claims, 5 Drawing Sheets

US 9,385,608 B1

DC-TO-DC CONVERTERS CAPABLE OF COMMUNICATING INFORMATION BETWEEN A SLAVE CIRCUIT AND A MASTER CONTROLLER, AND ASSOCIATED DEVICES AND METHODS

BACKGROUND

DC-to-DC converters are widely used in electronic devices. For example, many information technology devices include a DC-to-DC converter for converting bulk power from a battery, or from an off-line power supply, to a form suitable for powering a processor or other integrated circuit. Examples of DC-to-DC converters include, but are not limited to, buck-type DC-to-DC converters, boost-type DC-to-DC converters, and buck-boost type DC-to-DC converters.

Many DC-to-DC converters include multiple parallel-coupled power stages, or phases, such that the DC-to-DC converter may be referred to as a multi-phase DC-to-DC converter. The power stages are typically switched out-of-phase with respect to each other, to achieve ripple current cancelation, high effective switching frequency, and fast transient response.

Some DC-to-DC converters include a master controller and one or more slave circuits. The master controller includes some or all of the DC-to-DC converter control circuitry, and each slave circuit includes one or more switching circuits of the DC-to-DC converter. For example, some multi-phase DC-to-DC converters include a master controller and a respective slave circuit for each phase. Although not required, the master controller and each slave circuit are usually housed in respective integrated circuit packages.

SUMMARY

In an embodiment, a method for communicating information in a DC-to-DC converter including a master controller and at least a first slave circuit includes the following steps: (a) generating a first analog slave communication signal representing information associated with the first slave circuit; (b) communicatively coupling the first analog slave communication signal from the first slave circuit to the master controller at least partially using a first communication line; (c) in response to an occurrence of an event, generating a first digital slave communication signal representing additional information associated with the first slave circuit; and (d) communicatively coupling the first digital slave communication signal from the first slave circuit to the master controller at least partially using the first communication line.

In an embodiment, a slave circuit for a DC-to-DC converter includes a switching circuit adapted to repeatedly switch a switching node between two different voltage levels, a slave control adapted to control switching of the switching circuit based at least in part on control signals from a master controller, a communication port, and a communication module. The communication module is adapted to (a) generate an analog slave communication signal at the communication port, where the analog slave communication signal represents information associated with the slave circuit, and (b) generate a digital slave communication signal at the communication port in response to occurrence of an event, where the digital slave communication signal represents additional information associated with the slave circuit.

In an embodiment, a DC-to-DC converter includes a master controller and a plurality of slave circuits. Each slave circuit includes a switching circuit adapted to repeatedly switch a switching node of the slave circuit between two different voltage levels, a slave control adapted to control switching of the switching circuit based at least in part on control signals from the master controller, a communication port, and a communication module. The communication module of each slave circuit is adapted to (a) generate an analog slave communication signal at the communication port of the slave circuit, where the analog slave communication signal represents information associated with the slave circuit, and (b) generate a digital slave communication signal at the communication port of the slave circuit in response to occurrence of an event, where the digital slave communication signal represents additional information associated with the slave circuit. A respective energy storage inductor is electrically coupled to the switching node of each of the plurality of slave circuits, and communication lines communicatively couple the communication port of each of the plurality of slave circuits to the master controller.

DETAILED DESCRIPTION OF THE EMBODIMENTS

In a DC-to-DC converter including a master controller and one or more slave circuits, it may be desirable to communicate information, such as status and fault information, between the slave circuits and the master controller. Applicants have developed DC-to-DC converters and associated devices and methods, which as discussed below, are capable of communicating information between one or more slave circuits and a master controller, using only a single communication line connected to each slave circuit.

Figure 1:
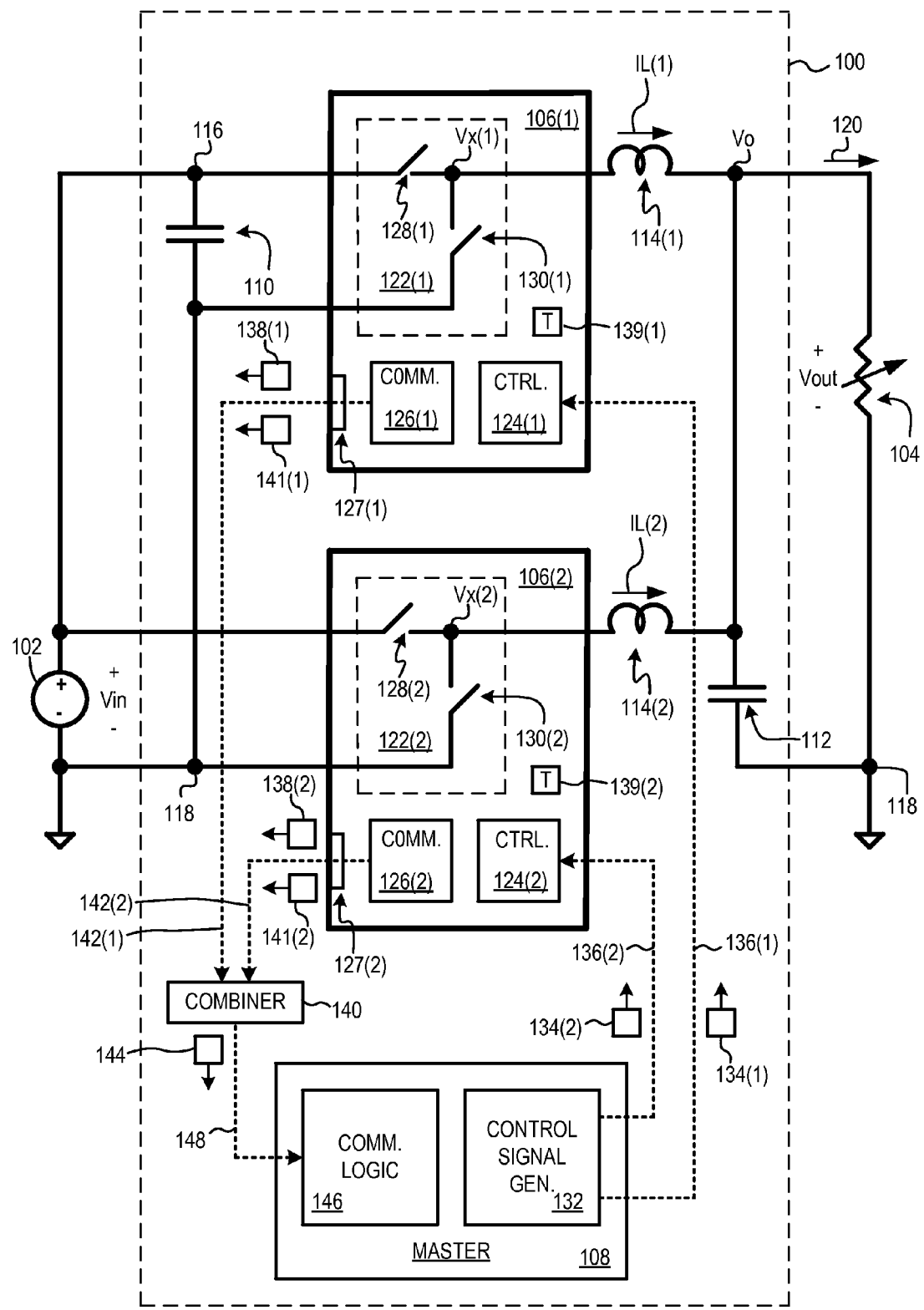
FIG. 1 shows one DC-to-DC converter capable of communicating information between a slave circuit and a master controller, according to an embodiment.

FIG. 1 shows a DC-to-DC converter 100 capable of communicating information between one or more slave circuits and a master controller. DC-to-DC converter 100 is a buck-type converter which transfers power from an input power source 102 to a load 104. Converter 100 includes one or more slave circuits 106 and a master controller 108. Although the FIG. 1 example shows DC-to-DC converter 100 including two slave circuits 106, the converter could be modified to have any number of slave circuits greater than zero. Thus, DC-to-DC converter 100 can be described as including N slave circuits 106, where N is an integer greater than zero. In this document, specific instances of an item may be referred to by use of a numeral in parentheses (e.g., slave circuit 106(1)) while numerals without parentheses refer to any such item (e.g., slave circuits 106).

DC-to-DC converter 100 further includes at least one input capacitor 110, at least one output capacitor 112, and a respective energy storage inductor 114 electrically coupled to each slave circuit 106. Input capacitor 110 is electrically coupled between a positive input node 116 and a reference node 118, and input capacitor 110 provides ripple current required by converter 100. Output capacitor 112 is electrically coupled between an output node Vo and reference node 118. Output capacitor 112 filters ripple current generated by converter 100, and output capacitor 112 may also help provide AC components of load current 120. Input power source 102 is electrically coupled between positive and reference nodes 116, 118, and load 104 is electrically coupled between output and reference nodes Vo, 118.

Each slave circuit 106 and its respective energy storage inductor 114 form a phase. Thus, converter 100 includes N phases. Although not required, each slave circuit 106 is typically integrated into a respective integrated circuit chip, and master controller 108 also is typically integrated into a respective integrated circuit chip. In certain embodiments, two or more of inductors 114 are magnetically coupled to improve converter performance relative to a converter with discrete, uncoupled, inductors 114.

Each slave circuit 106 includes a switching circuit 122, a slave control 124, a communication module 126, a communication port 127, and an optional temperature sensing subsystem 139 adapted to sense an operating temperature of the slave circuit. Each switching circuit 122 includes a high side switching device 128 and a low side switching device 130 electrically coupled at a switching node Vx. Switching devices 128, 130, for example, are transistors. The high side switching device 128 of each slave circuit 106 is electrically coupled between positive input node 116 and the switching node Vx of the slave circuit. Each low side switching device 130 is electrically coupled between the switching node Vx of the slave circuit and reference node 118. In the FIG. 1 embodiment, high side switching device 128 is a control switching device in that converter output voltage Vout is a function of the switch's duty cycle. Low side switching device 130 is a freewheeling device in that it provides a path for inductor current IL when the control switching device turns off. Thus, low side switching device 130 couples energy stored in inductor 114 to load 104. In some embodiments, low side switching devices 130 are external to and not part of slaves 106 and/or are replaced with diodes.

Each slave control 124 controls the switching circuit 122 of its slave circuit 106 at least partially in response to control signals 134, which in an embodiment include pulse width modulation (PWM) signals or pulse frequency modulation (PFM) signals, generated by a control signal generator 132 of master controller 108. Control signals 134 are communicated from master controller 108 to slave circuits 102 via control lines 136. Although FIG. 1 shows a dedicated control line 136 running to each slave circuit 106, two or more slave circuits 106 could share a common control line, such as by multiplexing signals 134 for multiple slave circuits on a common control line, without departing from the scope hereof.

Control signal generator 132 generates control signals 134 to cause switching circuits 122 to repeatedly switch their respective switching nodes Vx between positive and reference nodes 116, 118, thereby switching their respective switching nodes Vx between two different voltage levels, to transfer power from input power source 102 to load 104. Control signal generator 132 is typically configured to cause switching circuits 122 to switch at a frequency of at least 30 kilohertz, to promote low ripple current magnitude, fast transient response, and operation outside a frequency range perceivable by humans. Additionally, in many embodiments, control signal generator 132 causes switching circuits 122 to switch out of phase with respect to each other to achieve ripple current cancelation in output capacitor 112. In some embodiments, control signal generator 132 controls switching circuits 122 to regulate one or more converter parameters, such as converter input voltage Vin, converter input current, converter input power, converter output voltage Vout, converter load current 120, and/or converter output power.

In an alternative embodiment, each slave control 124 is replaced by a local pulse-width modulator for controlling it respective switching circuit 122. In such alternative embodiments, the local pulse-width modulators may be controlled by digital signals provided by master controller 108. In one such embodiment, local pulse-width modulators are controlled by loading them with binary-encoded pulse widths transmitted serially in digital form from master controller 108 via control lines 136.

Each communication module 126 has at least an analog transmission operating mode and a digital transmission operating mode. In the analog transmission operating mode, the communication module 126 generates an analog slave communication signal 138 at its respective communication port 127, where the analog slave communication signal represents information associated with the slave circuit, such as slave circuit status information. In the digital transmission operating mode, the communication module 126 generates a digital slave communication signal 141 at its respective communication port 127, where the digital slave communication signal represents additional information associated with slave circuit, such as additional status information or fault information.

Each communication module 126 typically operates in its analog transmission operating mode by default, and the communication module switches from its analog transmission operating mode to its digital transmission operating mode in response to an event, such as in response to a fault associated with its respective slave circuit 106, or in response to a request from master controller 108. For example, in some embodiments, each communication module 126 generates a respective analog slave communication signal 138 representing status of its respective slave circuit 106 during normal operating conditions, and each communication module 126 generates a respective digital slave communication signal 141 in response to a fault associated with its respective slave circuit 106, where the digital slave communication signal includes information about the fault. In some embodiments, each communication module 126 is capable of generating multiple digital slave communication signals 141 in response to an event, such as to provide multiple pieces of information about the event, or to provide the same information multiple times. Communication modules 126 could alternately operate in their digital transmission operating modes by default and switch to their analog transmission operating modes in response to an event, without departing from the scope hereof.

In some embodiments, analog slave communication signals 138 and digital slave communication signals 141 are voltage signals. In these embodiments, each communication module 126 generates its analog slave communication signal 138 by setting a voltage at its respective communication port 127 within a predetermined normal voltage range according to slave circuit 106 information. For example, in a particular embodiment, each communication module 126 linearly varies the voltage at its respective output port 127 according to slave circuit temperature sensed by its respective temperature sensing subsystem 139. Additionally, in embodiments where slave communication signals are voltage signals, each communication module 126 generates its digital slave communication signal 141 by driving the voltage at its respective communication port 127 between two different voltage levels, thereby generating digital pulses representing additional slave circuit 106 information. At least one of these two different voltage levels is typically outside of the predetermined normal voltage range of the analog transmission operating mode. For example, in a particular embodiment, each communication module 126 generates its digital slave communication signal 141 by driving the voltage at its respective output port 127 between two different power supply rails.

In some embodiments, each communication module 126 encodes its digital slave communication signal 141 with respective slave circuit 106 information using a pulse frequency modulation (PFM) technique, where the slave circuit information is represented by a number of pulses within a predetermined time period. For example, in certain embodiments, each communication module 126 generates a digital slave communication signal 141 having a number of pulses within a predetermined time period in a response to a fault, where the number of pulses represents fault information. In one particular implementation, one pulse within the predetermined time period indicates shorting of high side switching device 128, two pulses within the predetermined time period indicates shorting of the low side switching device 130, three pulses within the predetermined time period indicates an over-temperature condition, and four pulses within the predetermined time period indicates an under-voltage condition.

In some other embodiments, each communication module 126 encodes its digital slave communication signal 141 with respective slave circuit 106 information using a pulse width modulation (PWM) technique, where the slave circuit information is represented by width of one or more pulses. In yet other embodiments, each communication module 126 encodes its digital slave communication signal 141 with slave circuit 106 information by generating a pattern of pulses representing the slave circuit information.

Each communication module 126 is also optionally capable of signaling master controller 108 of an event occurrence, such as a fault associated with its respective slave circuit 106, by driving its analog slave communication signal 138 outside of the signal's predetermined normal range. For example, in one embodiment where analog slave communication signals 138 have a normal voltage range between one and two volts, each communication module 126 is capable of signaling a fault occurrence by driving its analog slave communication signal voltage either substantially lower than one volt, such as near zero volts, or substantially higher than two volts, such as near 3.3 volts. In some embodiments, each communication module 126 drives its analog slave communication signal 138 voltage either higher or lower than the predetermined normal range, depending on fault type or another slave circuit parameter. For example, in a particular embodiment, each communication module 126 drives its analog slave communication signal 138 voltage below the predetermined normal range in response to an over-temperature condition, and the communication module drives its analog slave communication signal voltage above the normal range in response to an over-current condition.

Each communication port 127 is communicatively coupled to a combiner 140 by a respective communication line 142. Thus, each communication line 142 is adapted to couple both analog and digital signals, i.e., either an analog slave communication signal 138 or a digital slave communication signal 141, from its respective slave circuit 106 to combiner 140. In some embodiments, each communication line 142 is a single electrical conductor, such as a single wire or a single printed circuit board conductive trace, thereby helping minimize the number of connections in DC-to-DC converter 100.

Combiner 140 generates a combined communication signal 144 from the slave communication signal 138 or 141 from each communication port 127. For example, in embodiments where slave communication signals 138, 141 are voltage signals, combiner 140 generates combined communication signal 144 from the voltage at each communication port 127. At times where each communication module 126 is generating an analog slave communication signal 138, combined communication signal 144 will be an analog signal derived from all analog slave communication signals 138. Combiner 140 is typically configured such that the value of combined communication signal 144 roughly approximates the average value of individual analog slave communication signals 138 under this condition. Additionally, combiner 140 is typically configured such that the value of combined communication signal 144 is outside of a normal range whenever the value of one or more individual analog slave communication signals 138 is outside of the normal range. At times where some communication modules 126 are generating analog slave communication signals 138, and some communication modules 126 are generating digital slave communication signals 141, combined communication signal 144 will include both an analog and a digital component. The digital component represents the one or more digital slave communication signals generated by communication modules 126. While it is anticipated that combiner 140 will typically be configured to weigh signals from all communication ports 127 equally, combiner 140 could alternately be configured to weigh signals from some communication ports 127 more heavily than others.

Figure 2:
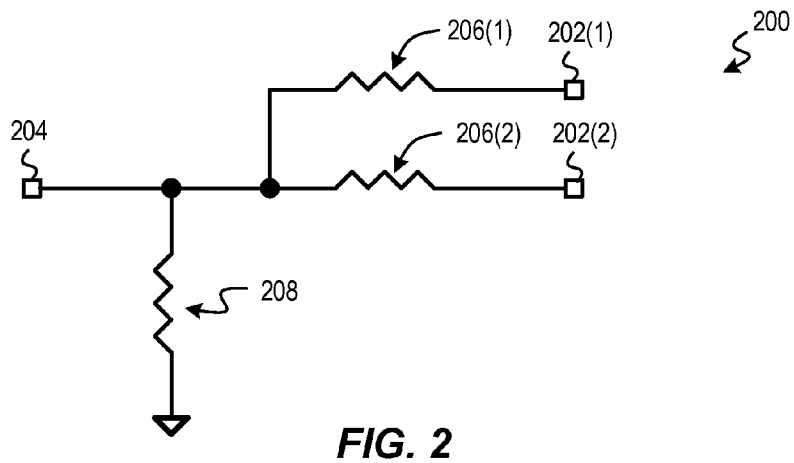
FIG. 2 illustrates one possible implementation of a signal combiner of the FIG. 1 DC-to-DC converter.

FIG. 2 illustrates a combiner 200, which is one possible implementation of combiner 140 when signals 138, 141, 144 are voltage signals. It should be understood, though, that combiner 140 could be implemented in manners other than that shown in FIG. 2. Combiner 200 includes a respective input port 202 for coupling to each communication port 127, such that each input port 202 receives a respective slave communication signal 138 or 141. Each input port 202 is electrically coupled to an output port 204 via a respective resistor 206, and output port 204 is electrically coupled to a reference node, such as a ground, by a resistor 208. Output port 204 outputs combined communication signal 144. In some embodiments, each resistor 206 has a resistance of 1,000 ohms, and resistor 208 has a resistance of 100,000 ohms. Additional input ports 202 and resistors 206 may be added to accommodate additional communication modules 126.

Combined communication signal 144 is communicatively coupled to communication logic 146 of master controller 108 by a single communication line 148. When all communication modules 126 are generating a respective analog slave communication signal 138, such during normal DC-to-DC converter operating conditions, communication logic 146 determines collective slave circuit 106 information from the value of combined communication signal 144. For example, in embodiments where each communication module 126 sets the value of its analog slave communication signal 138 according to a temperature sensed by its respective temperature sensing subsystem 139, communication logic 146 determines a representative temperature of all slave circuits 106 from a value of combined communication signal 144.

In the event a communication module 126 generates a digital slave communication signal 141 in response to occurrence of a fault or other event, communication logic 146 decodes a digital component of combined communication signal 144 to obtain information associated with the fault or other event. For example, in embodiments where communication modules 126 encode their digital slave communication signals 141 by PFM techniques, communication logic 146 decodes the digital component of combined communication signal 144 by counting a number of pulses of combined communication signal 144 within a predetermined time period. As another example, in embodiments where communication modules 126 encode their digital slave communication signals 141 by PWM techniques, communication logic 146 decodes the digital component of combined communication signal 144 by determining the widths of one or more pulses of combined communication signal 144. As yet another example, in embodiments where communication modules 126 encode their digital slave communication signals 141 by generating a pattern of pulses, communication logic 146 decodes the digital component of combined communication signal 144 by detecting a pulse pattern in combined communication signal 144.

As discussed above, in some embodiments, each communication module is adapted to drive its analog slave communication signal 138 outside of its predetermined normal range in response to occurrence of a fault of other event. In these embodiments, communication logic 146 recognizes occurrence of the fault or other event by determining that the value of combined communication signal 144 is outside of a normal range, and in some embodiments, communication logic determines information about the fault or other event from whether the value of combined communication signal 144 is above or below the normal range.

In some embodiments, communication logic 146 relays information derived from combined communication signal 144, such as slave circuit status and/or fault information, to an external system, such as a system hosting DC-to-DC converter 100. Alternately or additionally, master controller 108 uses some or all of information derived from combined communication signal 144 to control DC-to-DC converter 100. For example, in some embodiments, control signal generator 132 shuts down DC-to-DC converter 100 in response to a fault.

Figure 3:
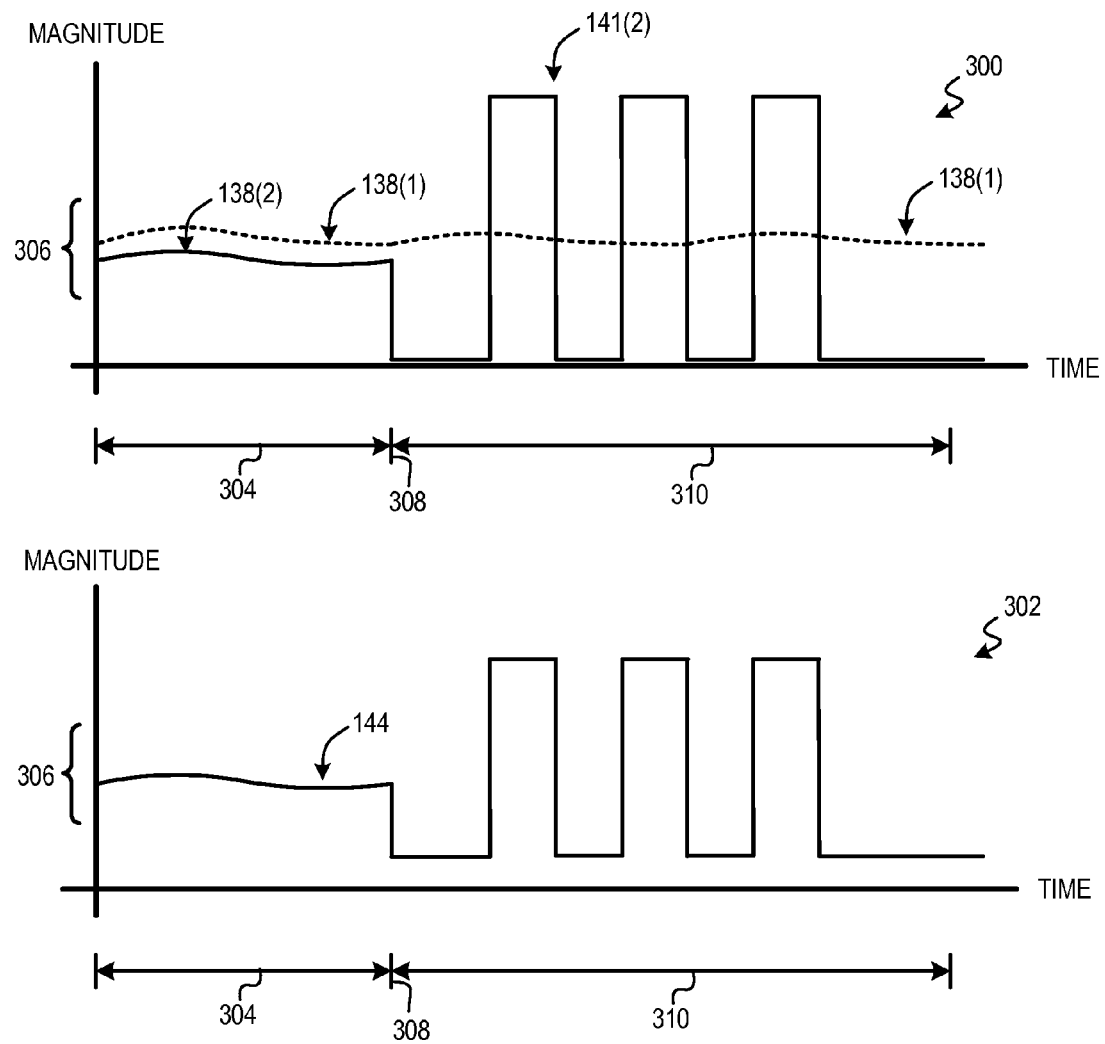
FIG. 3 shows two graphs illustrating communication waveforms of the FIG. 1 DC-to-DC converter during one example of normal operation and one example of a fault occurrence, according to an embodiment.

FIG. 3 shows two graphs 300, 302 illustrating one example of DC-to-DC converter 100 communication waveforms during normal operation and after a fault occurrence, in an embodiment where each communication module 126 is adapted to switch from its analog transmission operating mode to its digital transmission operating mode in response to a fault. The vertical axis of each graph 300, 302 represents signal magnitude, and the horizontal axis of each graph represents time. Graph 300 shows the slave communication signal at output port 127(1) in dashed lines, and the graph shows the slave communication signal at communication port 127(2) in solid lines. Graph 302 shows combined communication signal 144 during the same time as graph 300.

During a time period 304, slave circuits 106 are operating normally, and all communication modules generate a respective analog slave communication signal 138 within a predetermined normal range 306. Signals 138 represent, for example, temperature of their respective slave circuits 106 during normal operation. At time 308, slave circuit 106(2) experiences an over-temperature condition. In response, communication module 126(2) drives its analog slave communication signal 138(2) outside of predetermined normal range 306 to near zero magnitude, thereby indicating fault occurrence. Communication module 126(2) then generates digital slave communication signal 141(2), in place of analog slave communication signal 138(2), by generating three pulses within a predetermined time period 310, where three pulses within the time period indicates an over-temperature condition. Communication module 126(1) continues to generate analog slave communication signal 138(1) during time period 310.

As shown in graph 302, combined communication signal 144 is roughly the average of analog slave communication signals 138(1), 138(2) during time period 304. Communication logic 146 monitors the magnitude of combined communication signal 144 during this time period to determine the collective status of slave circuits 106. For example, in embodiments where slave communication signals 138 represent slave temperature, magnitude of combined communication signal 144 approximately represents the average temperature of slave circuits 106. After occurrence of a fault at time 308, combined communication signal 144 roughly follows the shape of digital slave communication signal 141(2), although the peaks and valleys of combined communication signal 144 are not as pronounced as those of digital slave communication signal 141(2), due to contribution of analog slave communication signal 138(1) to the combined signal. Thus, combined communication signal 144 has both an analog component and a digital component during time period 310.

The configuration of DC-to-DC converter 100 could be modified while still including information communication capability. For example, although DC-to-DC converter 100 is shown having a standard buck-type topology where high side switching devices 128 are control switches, converter 100 could be modified to have an inverted buck-type topology where low side switching devices 130 are control switches. Converter 100 could also be modified to have other DC-to-DC converter topologies such as a boost-type topology, a buck-boost-type topology, or an isolated topology, with or without magnetically coupled energy storage inductors. Some examples of isolated DC-to-DC converter topologies including coupled energy storage inductors are disclosed in U.S. Pat. No. 7,239,530 to Djekic et al., which is incorporated herein by reference.

Furthermore, although combiner 140 is shown as being a discrete subsystem, in some alternate embodiments, combiner 140 is partially or completely incorporated in one or more slave circuits 106. For example, in one alternate embodiment, combiner 140 is incorporated in slave circuit 106(2), such that slave communication signal 138(1) or 141(1) from slave circuit 106(1) is combined with slave communication signal 138(2) or 141(2) within slave circuit 106(2), to generate combined communication signal 144, which is communicatively coupled from slave circuit 106(2) to communication logic 146. Additionally, combiner 140 could alternately be partially or completely incorporated in master controller 108, without departing from the scope hereof.

Moreover, in some alternate embodiments, combiner 140 is omitted, and each slave communication signal 138/141 is communicatively coupled to communication logic 146. In these embodiments, communication logic 146 is modified to monitor each slave communication signal 138/141, thereby potentially enabling master controller 108 to determine the individual status of each slave circuit 106, as well as identify a particular slave circuit 106 experiencing a fault or other event occurrence.

Figure 4:
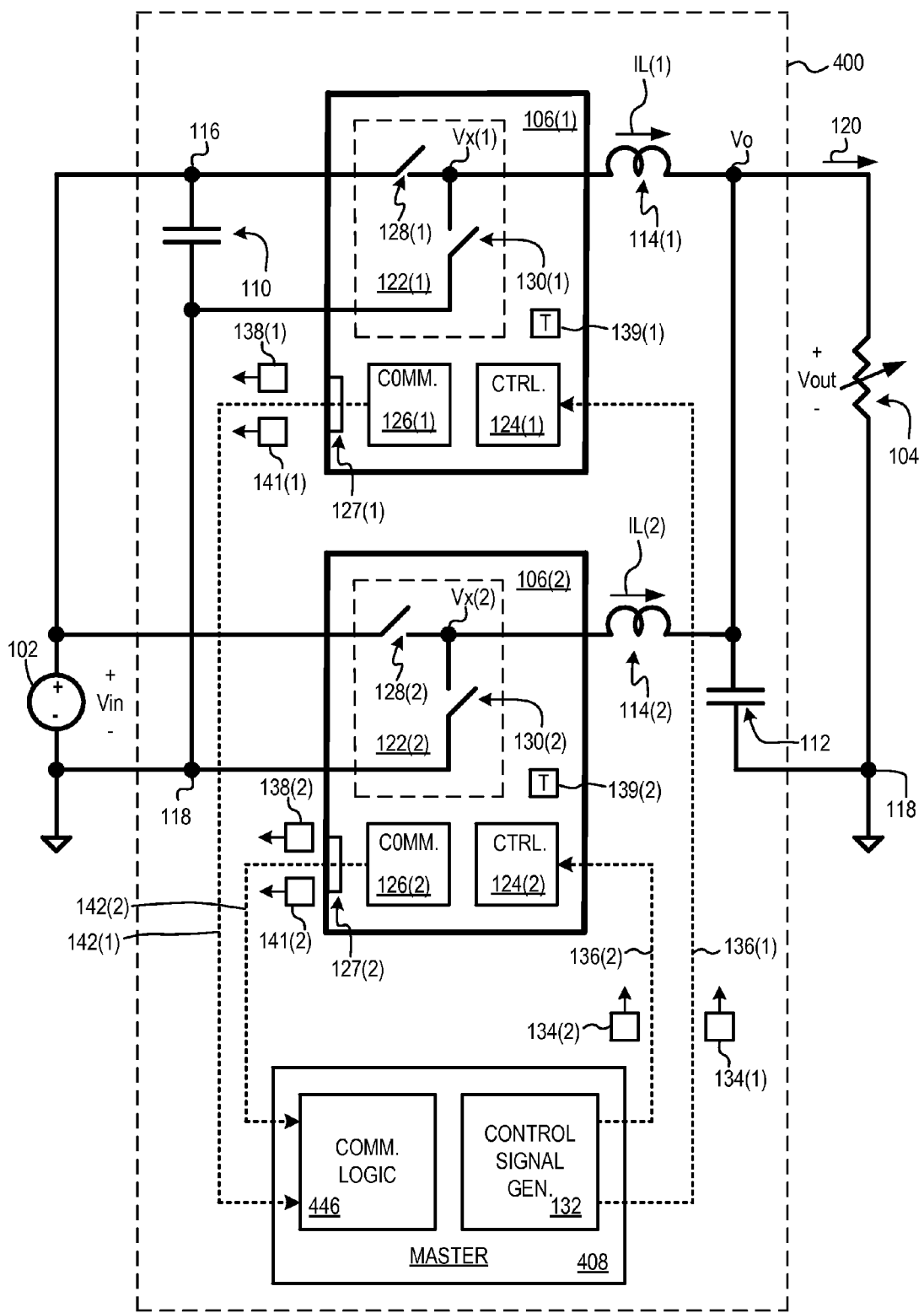
FIG. 4 shows a DC-to-DC converter similar to that of FIG. 1, but without a combiner, according to an embodiment.

For example, FIG. 4 shows a DC-to-DC converter 400 similar to DC-to-DC converter 100 of FIG. 1, but with each slave communication signal 138 or 141 communicatively coupled to communication logic 446 of a master controller 408 via a respective communication line 142. Communication logic 446 is similar to communication logic 146 of FIG.

1, but communication logic 446 monitors each slave communication signal 138 or 141, instead of a combined communication signal derived from all slave communication signals. When a communication module 126 of a given slave circuit 106 is generating an analog slave communication signal 138, such as during normal slave circuit operation, communication logic 446 determines information associated with the slave circuit 106 from the value of the analog slave communication signal. For example, in certain embodiments where each slave circuit 106 includes a temperature sensing subsystem 139, communication logic 446 determines each slave circuit 106's temperature from the value of its respective analog slave communication signal 138. During a fault or other event occurrence associated with a given slave circuit 106, communication logic 446 decodes a digital slave communication signal 141 generated by the communication module 126 of the slave circuit to determine additional information associated with the slave circuit, such as fault information. For example, in certain embodiments of DC-to-DC converter 400, in the event slave circuit 106(2) experiences a fault, communication logic 446 recognizes the fault by detecting that a value of analog slave communication signal 138(2) is outside of its predetermined normal range. Communication logic 446 also decodes digital slave communication signal 141(2) to obtain information about the fault, in these embodiments.

Figure 5:
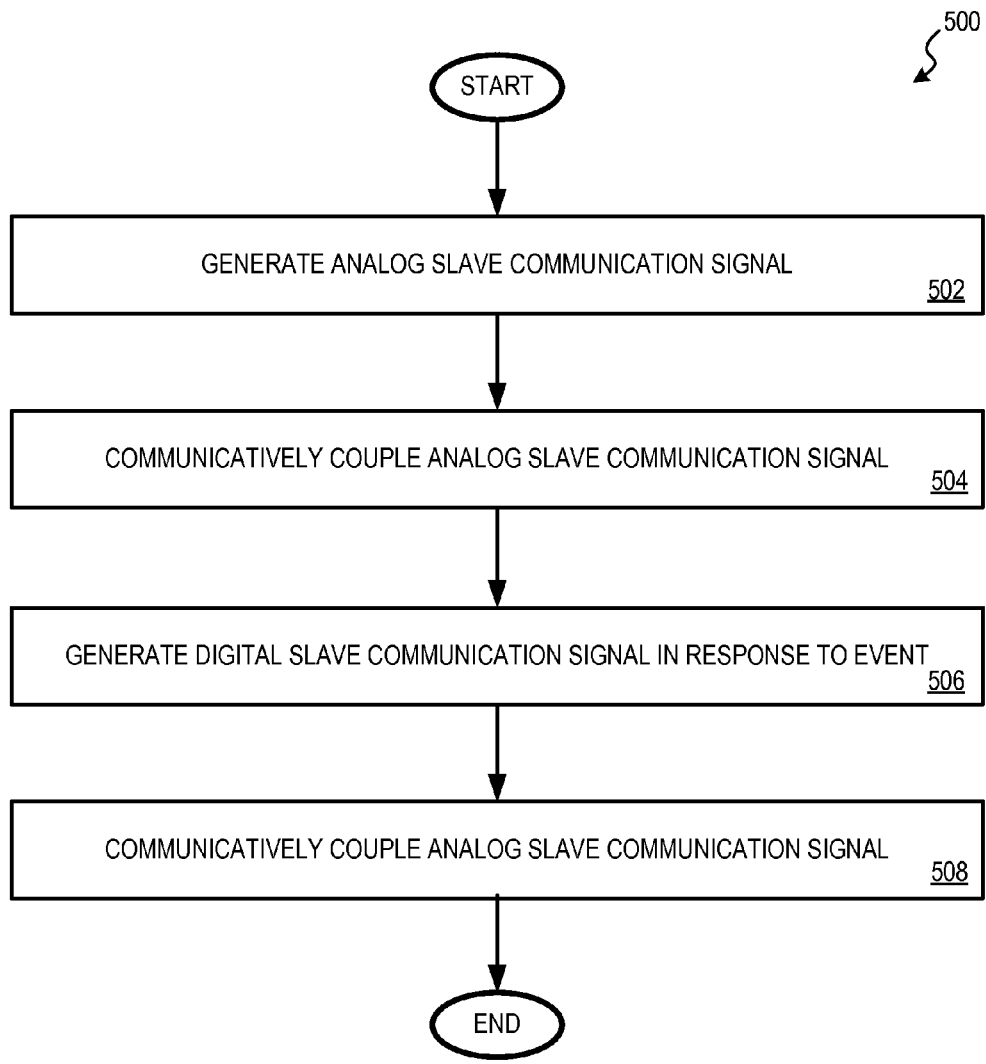
FIG. 5 shows one method for communicating information in a DC-to-DC converter including a plurality of slave circuits and a master controller, according to an embodiment.

FIG. 5 shows one method 500 for communicating information in a DC-to-DC converter including a master controller and at least a first slave circuit. In step 502, an analog slave communication signal is generated, where the analog slave communication signal represents information associated with the first slave circuit. In one example of step 502, communication module 126(1) generates analog slave communication signal 138(1) representing temperature of slave circuit 106(1) (see FIG. 1 or 4). In step 504, the analog slave communication signal is communicatively coupled from the first slave circuit to the master controller at least partially using a first communication line. In one example of step 504, analog slave communication signal 138(1) is communicatively coupled from slave circuit 106(1) to master controller 108 partially using communication line 142(1) (see FIG. 1). In another example of step 504, analog slave communication signal 138(1) is communicatively coupled from slave circuit 106(1) to master controller 408 completely using communication line 142(1) (see FIG. 4).

In step 506, a digital slave communication signal is generated in response to occurrence of an event. In one example of step 506, communication module 126(1) generates digital slave communication signal 141(1) in response to a fault associated with slave circuit 106(1), where the digital slave communication signal includes information about the fault (see FIG. 1 or 4). In step 508, the digital slave communication signal is communicatively coupled from the first slave circuit to the master controller at least partially using the first communication line. In one example of step 508, digital slave communication signal 141(1) is communicatively coupled from slave circuit 106(1) to master controller 108 partially using communication line 142(1) (see FIG. 1). In another example of step 508, digital slave communication signal 141(1) is communicatively coupled from slave circuit 106(1) to master controller 408 completely using communication line 142(1) (see FIG. 4).

The above-disclosed systems and methods for communicating information using only a single communication line for each slave circuit could be extended to support two-way communication between a master controller and one or more slave circuits. For example, in some alternate embodiments of DC-to-DC converters 100 and 400 (FIGS. 1 and 4), not only do communication lines 142 communicatively couple slave communication signals 138/141 from slave circuits 106 to master controller 108/408, but communication lines 142 also communicatively couple information, such as requests for slave circuit status, from master controller 108/408 to slave circuits 106.

Figure 6:
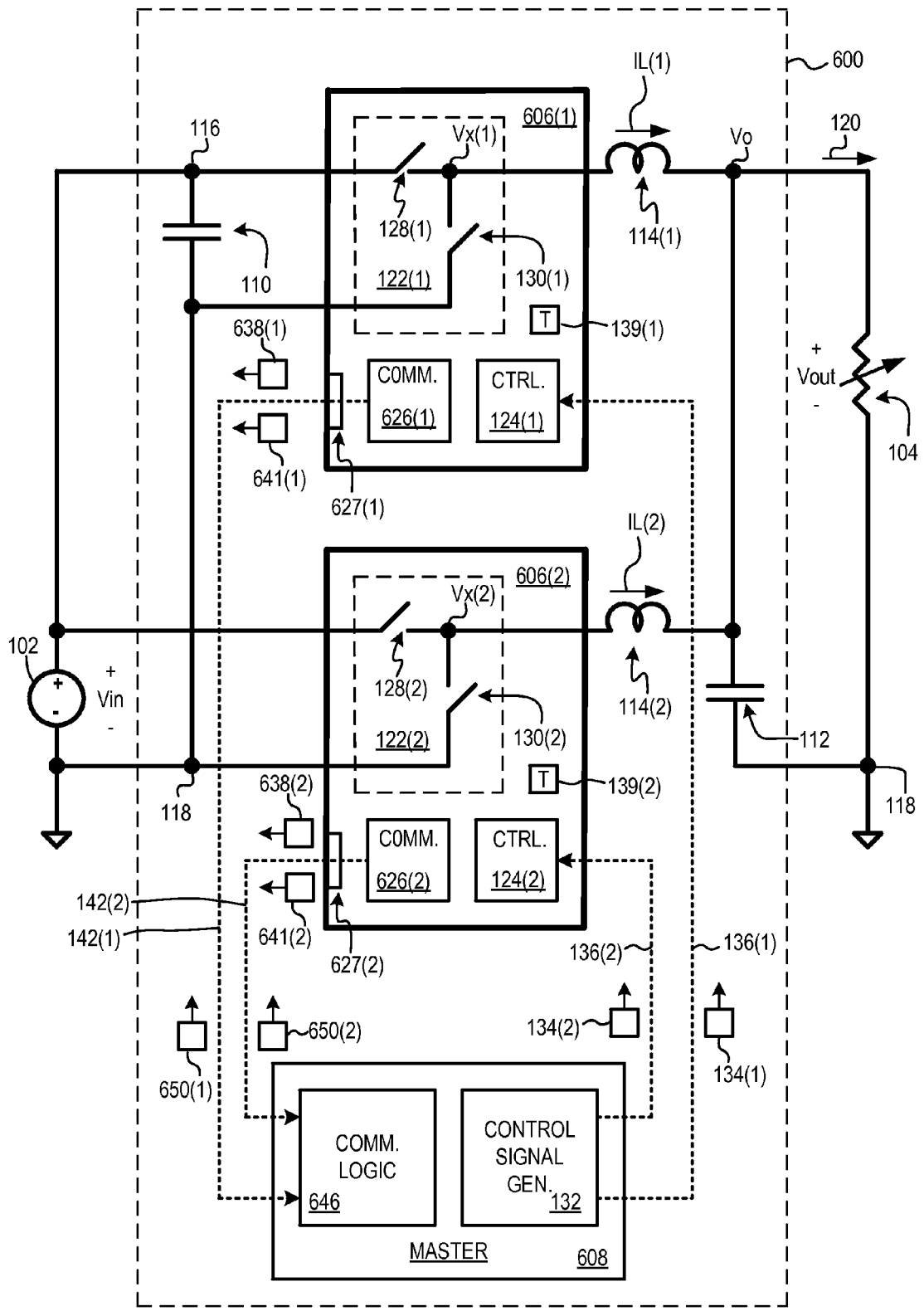
FIG. 6 shows a DC-to-DC converter similar to that of FIG. 4, but further supporting two-way communication between slave circuits and a master controller, according to an embodiment.

For example, FIG. 6 illustrates a DC-to-DC converter 600 similar to DC-to-DC converter 400 of FIG. 4, but where slave communication lines 142 support two-way communication between slave circuits 606 and a master controller 608. Slave circuits 606 are similar to slave circuits 106 of FIGS. 1 and 4, but include communication logic 626 adapted to receive master communication signals 650 from master controller 608, as well as to generate slave communication signals 638 and 641. Master controller 608 is similar master controller 408 of FIG. 4, but includes communication logic 646 adapted to generate master communication signals 650, as well as to receive slave communication signals 638 and 641.

Each communication module 626 has at least an analog transmission operating mode and a digital transmission operating mode, in a manner similar to that discussed above with respect to DC-to-DC converters 100 and 400 of FIGS. 1 and 4, respectively. During the analog transmission operating mode, the communication module 626 generates an analog slave communication signal 638 representing information associated with the slave circuit. For example, in certain embodiments where slave circuits 606 include respective temperature sensing subsystems 139, each communication module 626 sets the value of its analog slave communication signal 638, within a predetermined normal range, in response to the slave circuit temperature. In the digital transmission operating mode, the communication module 626 generates a digital slave communication signal 641 representing additional information associated with the slave circuit. For example, in certain embodiments, when a given slave circuit 606 experiences a fault, the communication module 626 of the slave circuit generates a digital slave communication signal 641, instead of an analog slave communication signal 638, where the digital slave communication signal includes information about the fault.

Each communication module 626 optionally signals occurrence of a fault, or other event, associated with its respective slave circuit 606 by driving the slave circuit's analog slave communication signal 638 outside of the signal's predetermined normal range. For example, in one embodiment where analog slave communication signals 638 are voltage signals and the signal's normal voltage range is between one and two volts, communication module 626 signals a fault occurrence by driving the signal voltage either substantially lower than one volt, such as near zero volts, or substantially higher than two volts, such as near 3.3 volts.

Each communication module 626 is also adapted to switch from its analog transmission operating mode to its digital transmission operating mode in response to an event, such as a fault associated with its respective slave circuit 606, and/or receipt of a master communication signal 650. Each communication module 626 digitally encodes its digital slave communication signal 641 with respective slave circuit information, for example, using PFM or PWM techniques, or by generating a pulse pattern. Examples of possible information encoded in digital slave communication signal 641 include, but are not limited to, slave circuit operating condition information and/or fault information. In some embodiments, each communication module 626 automatically encodes its digital slave communication signal 641 with information identifying a fault, in response to occurrence of the fault. As another example, in some embodiments, each communication module 626 encodes its digital slave communication signal 641 with slave circuit status information in response to receipt of a master communication signal 650.

In some embodiments, each communication module 626 generates its analog slave communication signal 638 by setting a voltage at its respective communication port 627 within a predetermined normal voltage range according to slave circuit 606 information. For example, in a particular embodiment, each communication module 626 linearly varies the voltage at is respective communication port 627 according to a slave circuit temperature sensed by its respective temperature subsystem 139. Additionally, in some embodiments, each communication module 626 generates its digital slave communication signal 641 by driving the voltage at its respective communication port 627 between two different voltage levels, thereby generating digital pulses representing additional slave circuit 606 information. At least one of these two different voltage levels is typically outside of the predetermined normal voltage range of the analog transmission operating mode. For example, in a particular embodiment, each communication module 626 generates its digital slave communication signal 641 by driving the voltage at its respective output port 627 between two different power supply rails.

Combinations of Features

Features described above as well as those claimed below may be combined in various ways without departing from the scope hereof. The following examples illustrate some possible combinations:

(A1) A method for communicating information in a DC-to-DC converter including a master controller and at least a first slave circuit may include: (a) generating a first analog slave communication signal representing information associated with the first slave circuit, (b) communicatively coupling the first analog slave communication signal from the first slave circuit to the master controller at least partially using a first communication line, (c) in response to an occurrence of an event, generating a first digital slave communication signal representing additional information associated with the first slave circuit, and (d) communicatively coupling the first digital slave communication signal from the first slave circuit to the master controller at least partially using the first communication line.

(A2) In the method denoted as (A1), the step of generating the first analog slave communication signal may include setting a voltage at a communication port of the first slave circuit to a value within a predetermined normal range, and the step of generating the first digital slave communication signal may include generating one or more pulses by driving the voltage at the communication port of the first slave circuit between two different voltage levels.

(A3) The method denoted as (A2) may further include driving the voltage at the communication port of the first slave circuit outside of the predetermined normal range is response to occurrence of the event.

(A4) Any of the methods denoted as (A1) through (A3) may further include: (a) generating a second analog slave communication signal having a value representing information associated with a second slave circuit, the second slave circuit being different from the first slave circuit, and (b) communicatively coupling the second analog slave communication signal from the second slave circuit to the master controller at least partially using a second communication line.

(A5) The method denoted as (A4) may further include: (a) generating a combined communication signal from at least the first and second analog slave communication signals using a combiner, and (b) communicatively coupling the combined communication signal from the combiner to the master controller.

(A6) The method denoted as (A4) may further include: (a) generating a combined communication signal from at least the first digital slave communication signal and the second analog slave communication signal using a combiner, and (b) communicatively coupling the combined communication signal from the combiner to the master controller.

(A7) The method denoted as (A6) may further include decoding, in the master controller, a digital component of the combined communication signal to obtain the additional information associated with the first slave circuit.

(A8) The method denoted as (A4) may further include decoding, in the master controller, the first digital slave communication signal to obtain the additional information associated with the first slave circuit.

(A9) In any of the methods denoted as (A1) through (A8), the step of generating the first digital slave communication signal may include generating a number of pulses within a predetermined time period, the number of pulses representing the additional information associated with the first slave circuit.

(A10) In any of the methods denoted as (A1) through (A8), the step of generating the first digital slave communication signal may include generating one or more pulses having a pulse width representing the additional information associated with the first slave circuit.

(A11) In any of the methods denoted as (A1) through (A8), the step of generating the first digital slave communication signal may include generating a pulse pattern representing the additional information associated with the first slave circuit.

(A12) In any of the methods denoted as (A1) through (A11), the event may include a fault associated with the first slave circuit, and the additional information associated with the first slave circuit may include information about the fault.

(A13) In any of the methods denoted as (A1) through (A12), the information associated with the first slave circuit may include a temperature of the first slave circuit.

(A14) In any of the methods denoted as (A1) through (A13), the event may include receipt, by the first slave circuit, of a master control signal from the master controller.

(B1) A slave circuit for a DC-to-DC converter may include: (a) a switching circuit adapted to repeatedly switch a switching node between two different voltage levels; (b) a slave control adapted to control switching of the switching circuit based at least in part on control signals from a master controller; (c) a communication port; and (d) a communication module adapted to: (1) generate an analog slave communication signal at the communication port, the analog slave communication signal representing information associated with the slave circuit, and (2) generate a digital slave communication signal at the communication port in response to occurrence of an event, the digital slave communication signal representing additional information associated with the slave circuit.

(B2) In the slave circuit denoted as (B1), the communication module may be further adapted to: (a) generate the analog slave communication signal by setting a voltage at the communication port to a value within a predetermined normal range, and (b) generate the digital slave communication signal by driving the voltage at the communication port between two different voltage levels.

(B3) In the slave circuit denoted as (B2), the communication module may be further adapted to drive the voltage at the communication port outside of the predetermined normal range, in response to the event.

(B4) In any of the slave circuits denoted as (B1) through (B3), the communication module may be further adapted to generate the digital slave communication signal by generating a number of pulses within a predetermined time period, the number of pulses representing the additional information associated with the slave circuit.

(B5) In any of the slave circuits denoted as (B1) through (B3), the communication module may be further adapted to generate the digital slave communication signal by generating one or more pulses having a pulse width representing the additional information associated with the slave circuit.

(B6) In any of the slave circuits denoted as (B1) through (B3), the communication module may be further adapted to generate the digital slave communication signal by generating a pulse pattern representing the additional information associated with the slave circuit.

(B7) In any of the slave circuits denoted as (B1) through (B6), the event may be a fault associated with the slave circuit, and the additional information associated with the slave circuit may include information about the fault.

(B8) Any of the slave circuits denoted as (B1) through (B7) may further include a temperature sensing subsystem adapted to sense a temperature of the slave circuit, and the communication module may be further adapted to set a value of the analog slave communication signal in response to the temperature of the slave circuit.

(B9) In any of the slave circuits denoted as (B1) through (B8): (a) the communication module may be further adapted to receive a master communication signal at the communication port, and (b) the event may include receipt of the master communication signal at the communication port.

(C1) A DC-to-DC converter may include: (a) a master controller; (b) a plurality of slave circuits, each slave circuit including: (1) a switching circuit adapted to repeatedly switch a switching node of the slave circuit between two different voltage levels, (2) a slave control adapted to control switching of the switching circuit based at least in part on control signals from the master controller, (3) a communication port, and (4) a communication module adapted to: (i) generate an analog slave communication signal at the communication port of the slave circuit, the analog slave communication signal representing information associated with the slave circuit, and (ii) generate a digital slave communication signal at the communication port of the slave circuit in response to occurrence of an event, the digital slave communication signal representing additional information associated with the slave circuit; (c) a respective energy storage inductor electrically coupled to the switching node of each of the plurality of slave circuits; and (d) communication lines communicatively coupling the communication port of each of the plurality of slave circuits to the master controller.

(C2) In the DC-to-DC converter denoted as (C1), the communication module of each of the plurality of slave circuits may be further adapted to: (a) generate the analog slave communication signal of the slave circuit by setting a voltage at the communication port of the slave circuit to a value within a predetermined normal range, and (b) generate the digital slave communication signal of the slave circuit by driving the voltage at the communication port of the slave circuit between two different voltage levels.

(C3) In the DC-to-DC converter denoted as (C2), the communication module of each of the plurality of slave circuits may be further adapted to drive the voltage at the communication port of the slave circuit outside of the predetermined normal range, in response to the event.

(C4) Any of the DC-to-DC converters denoted as (C1) through (C3) may further include: (a) a combiner adapted to generate a combined communication signal from the voltage at the communication port of each of the plurality of slave circuits, and (b) additional communication lines adapted to communicatively couple the combined communication signal from the combiner to the master controller.

(C5) In the DC-to-DC converter denoted as (C4), the master controller may include communication logic adapted to decode a digital component of the combined communication signal to obtain additional information associated with one of the plurality of slave circuits.

(C6) In any of the DC-to-DC converters denoted as (C1) through (C3), the master controller may include communication logic adapted to decode a digital slave communication signal of one of the plurality of slave circuits to obtain additional information associated with the slave circuit.

(C7) In any of the DC-to-DC converters denoted as (C1) through (C6), the communication module of each of the plurality of slave circuits may be further adapted to generate the digital slave communication signal at the communication port of the slave circuit by generating a number of pulses within a predetermined time period, the number of pulses representing the additional information associated with the slave circuit.

(C8) In any of the DC-to-DC converters denoted as (C1) through (C6), the communication module of each of the plurality of slave circuits may be further adapted to generate the digital slave communication signal at the communication port of the slave circuit by generating one or more pulses having a pulse width representing the additional information associated with the slave circuit.

(C9) In any of the DC-to-DC converters denoted as (C1) through (C6), the communication module of each of the plurality of slave circuits may be further adapted to generate the digital slave communication signal at the communication port of the slave circuit by representing a pulse pattern corresponding to the additional information associated with the slave circuit.

(C10) In any of the DC-to-DC converters denoted as (C1) through (C9), the communication module of each of the plurality of slave circuits may be further adapted to generate the digital slave communication signal at the communication port of the slave circuit in response to a fault associated with the slave circuit, and the digital communication signal may include information about the fault.

(C11) In any of the DC-to-DC converters denoted as (C1) through (C10): (a) the master controller may be further adapted to generate a master communication signal, (b) the communication module of each of the plurality of slave circuits may be further adapted to receive the master communication signal at the communication port of the slave circuit, and (c) the event may include receipt of the master communication signal at the communication port of one of the plurality of slave circuits.

Changes may be made in the above methods, systems, and devices without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for communicating information in a DC-to-DC converter including a master controller and at least a first slave circuit, comprising:
  generating a first analog slave communication signal representing information associated with the first slave circuit;
  communicatively coupling the first analog slave communication signal from the first slave circuit to the master controller at least partially using a first communication line;
  in response to an occurrence of an event, generating a first digital slave communication signal representing additional information associated with the first slave circuit; and
  communicatively coupling the first digital slave communication signal from the first slave circuit to the master controller at least partially using the first communication line.

2. The method of claim 1, wherein:
  the step of generating the first analog slave communication signal comprises setting a voltage at a communication port of the first slave circuit to a value within a predetermined normal range; and
  the step of generating the first digital slave communication signal comprises generating one or more pulses by driving the voltage at the communication port of the first slave circuit between two different voltage levels.

3. The method of claim 2, further comprising driving the voltage at the communication port of the first slave circuit outside of the predetermined normal range is response to occurrence of the event.

4. The method of claim 3, further comprising:
  generating a second analog slave communication signal having a value representing information associated with a second slave circuit, the second slave circuit being different from the first slave circuit; and
  communicatively coupling the second analog slave communication signal from the second slave circuit to the master controller at least partially using a second communication line.

5. The method of claim 4, further comprising:
  generating a combined communication signal from at least the first and second analog slave communication signals using a combiner; and
  communicatively coupling the combined communication signal from the combiner to the master controller.

6. The method of claim 4, further comprising:
  generating a combined communication signal from at least the first digital slave communication signal and the second analog slave communication signal using a combiner; and
  communicatively coupling the combined communication signal from the combiner to the master controller.

7. The method of claim 6, further comprising decoding, in the master controller, a digital component of the combined communication signal to obtain the additional information associated with the first slave circuit.

8. The method of claim 2, further comprising decoding, in the master controller, the first digital slave communication signal to obtain the additional information associated with the first slave circuit.

9. The method of claim 2, the step of generating the first digital slave communication signal comprising generating a number of pulses within a predetermined time period, the number of pulses representing the additional information associated with the first slave circuit.

10. The method of claim 2, the step of generating the first digital slave communication signal comprising generating one or more pulses having a pulse width representing the additional information associated with the first slave circuit.

11. The method of claim 2, the step of generating the first digital slave communication signal comprising generating a pulse pattern representing the additional information associated with the first slave circuit.

12. The method of claim 2, the event comprising a fault associated with the first slave circuit, and the additional information associated with the first slave circuit comprising information about the fault.

13. The method of claim 12, the information associated with the first slave circuit comprising a temperature of the first slave circuit.

14. The method of claim 2, wherein the event comprises receipt, by the first slave circuit, of a master control signal from the master controller.

15. A slave circuit for a DC-to-DC converter, comprising:
  a switching circuit adapted to repeatedly switch a switching node between two different voltage levels;
  a slave control adapted to control switching of the switching circuit based at least in part on control signals from a master controller;
  a communication port; and
  a communication module adapted to:
    generate an analog slave communication signal at the communication port, the analog slave communication signal representing information associated with the slave circuit,
    generate a digital slave communication signal at the communication port in response to occurrence of an event, the digital slave communication signal representing additional information associated with the slave circuit,
    generate the analog slave communication signal by setting a voltage at the communication port to a value within a predetermined normal range, and
    generate the digital slave communication signal by driving the voltage at the communication port between two different voltage levels.

16. The slave circuit of claim 15, the communication module being further adapted to drive the voltage at the communication port outside of the predetermined normal range, in response to the event.

17. The slave circuit of claim 15, the communication module being further adapted to generate the digital slave communication signal by generating a number of pulses within a predetermined time period, the number of pulses representing the additional information associated with the slave circuit.

18. The slave circuit of claim 15, the communication module being further adapted to generate the digital slave communication signal by generating one or more pulses having a pulse width representing the additional information associated with the slave circuit.

19. The slave circuit of claim 15, the communication module being further adapted to generate the digital slave communication signal by generating a pulse pattern representing the additional information associated with the slave circuit.

20. The slave circuit of claim 15, the event being a fault associated with the slave circuit, the additional information associated with the slave circuit comprising information about the fault.

21. The slave circuit of claim 20, further comprising a temperature sensing subsystem adapted to sense a temperature of the slave circuit, wherein the communication module is further adapted to set a value of the analog slave communication signal in response to the temperature of the slave circuit.

22. The slave circuit of claim 15, wherein:
the communication module is further adapted to receive a master communication signal at the communication port; and
the event comprises receipt of the master communication signal at the communication port.

23. A DC-to-DC converter, comprising:
a master controller;
a plurality of slave circuits, each slave circuit including:
   a switching circuit adapted to repeatedly switch a switching node of the slave circuit between two different voltage levels,
   a slave control adapted to control switching of the switching circuit based at least in part on control signals from the master controller,
   a communication port, and
   a communication module adapted to:
      generate an analog slave communication signal at the communication port of the slave circuit, the analog slave communication signal representing information associated with the slave circuit,
      generate a digital slave communication signal at the communication port of the slave circuit in response to occurrence of an event, the digital slave communication signal representing additional information associated with the slave circuit,
      generate the analog slave communication signal of the slave circuit by setting a voltage at the communication port of the slave circuit to a value within a predetermined normal range, and
      generate the digital slave communication signal of the slave circuit by driving the voltage at the communication port of the slave circuit between two different voltage levels;
a respective energy storage inductor electrically coupled to the switching node of each of the plurality of slave circuits; and
communication lines communicatively coupling the communication port of each of the plurality of slave circuits to the master controller.

24. The DC-to-DC converter of claim 23, wherein the communication module of each of the plurality of slave circuits is further adapted to drive the voltage at the communication port of the slave circuit outside of the predetermined normal range, in response to the event.

25. The DC-to-DC converter of claim 24, further comprising:
a combiner adapted to generate a combined communication signal from the voltage at the communication port of each of the plurality of slave circuits; and
additional communication lines adapted to communicatively couple the combined communication signal from the combiner to the master controller.

26. The DC-to-DC converter of claim 25, the master controller comprising communication logic adapted to decode a digital component of the combined communication signal to obtain additional information associated with one of the plurality of slave circuits.

27. The DC-to-DC converter of claim 23, the master controller comprising communication logic adapted to decode a digital slave communication signal of one of the plurality of slave circuits to obtain additional information associated with the slave circuit.

28. The DC-to-DC converter of claim 23, the communication module of each of the plurality of slave circuits being further adapted to generate the digital slave communication signal at the communication port of the slave circuit by generating a number of pulses within a predetermined time period, the number of pulses representing the additional information associated with the slave circuit.

29. The DC-to-DC converter of claim 23, the communication module of each of the plurality of slave circuits being further adapted to generate the digital slave communication signal at the communication port of the slave circuit by generating one or more pulses having a pulse width representing the additional information associated with the slave circuit.

30. The DC-to-DC converter of claim 23, the communication module of each of the plurality of slave circuits being further adapted to generate the digital slave communication signal at the communication port of the slave circuit by representing a pulse pattern corresponding to the additional information associated with the slave circuit.

31. The DC-to-DC converter of claim 23, the communication module of each of the plurality of slave circuits being further adapted to generate the digital slave communication signal at the communication port of the slave circuit in response to a fault associated with the slave circuit, the digital communication signal comprising information about the fault.

32. The DC-to-DC converter of claim 23, wherein:
the master controller is further adapted to generate a master communication signal;
the communication module of each of the plurality of slave circuits is further adapted to receive the master communication signal at the communication port of the slave circuit; and
the event comprises receipt of the master communication signal at the communication port of one of the plurality of slave circuits.

* * * * *